United States Patent [19]

Nomura

[11] Patent Number: 5,188,650
[45] Date of Patent: Feb. 23, 1993

[54] PRESS MOLDING METHOD FOR AN OPTICAL ELEMENT AND APPARATUS THEREFOR

[75] Inventor: Takeshi Nomura, Tokyo, Japan
[73] Assignee: Canon Kabushiki Kaisha, Tokyo, Japan
[21] Appl. No.: 807,509
[22] Filed: Dec. 16, 1991
[30] Foreign Application Priority Data
Dec. 28, 1990 [JP] Japan .................. 2-415473
Nov. 25, 1991 [JP] Japan .................. 3-335475
[51] Int. Cl.$^5$ ............................................ C03B 23/00
[52] U.S. Cl. ........................................ 65/64; 65/77; 65/102; 65/104; 425/808
[58] Field of Search ............. 65/39, 102, 104, 66, 65/77, 64, 68; 425/808

[56] References Cited

U.S. PATENT DOCUMENTS

| | | |
|---|---|---|
| 4,591,373 | 5/1986 | Sato .................. 65/102 X |
| 4,734,118 | 3/1988 | Marechal et al. ........... 65/102 |
| 4,921,519 | 5/1990 | Schinker et al. ........... 65/39 |

FOREIGN PATENT DOCUMENTS

64-87524 3/1989 Japan .
2-38329 2/1990 Japan .

Primary Examiner—Robert L. Lindsay
Attorney, Agent, or Firm—Fitzpatrick, Cella, Harper & Scinto

[57] ABSTRACT

Molding is effected while pressing pressure is continuously or stepwise controlled so that at the initial stage in which the temperature distribution of a glass blank is not sufficiently uniformized, molding may be effected with relatively low pressing pessure and in a state in which the whole of the glass blank is uniformly increased in temperature, press molding may be effected with the pressing pressure increased. In a press molding apparatus for an optical element, during press molding, the glass blank is press-molded while the pressing pressure is continuously or stepwise varied so that at a temperature whereat the glass viscosity of the glass blank corresponds to $10^{21}-10^{11}$ poise, molding may be started with pressing pressure of 10 kg/cm$^2$–100 kg/cm$^2$, and thereafter in a temperature range in which the glass viscosity x of the central portion of the glass blank corresponds to $10^{11}-10^{10}$ poise, pressing pressure in the range of $10 \times (10^{11-x}) - 100 + 10 \times (10^{11-x})$ kg/cm$^2$ may be applied, and further at a temperature whereat the glass viscosity corresponds to $10^{10}$ or less, pressing pressure of 100 kg/cm$^2$ or greater may be applied.

5 Claims, 7 Drawing Sheets

PRESS MOLDING METHOD FOR AN OPTICAL ELEMENT AND APPARATUS THEREFOR

BACKGROUND OF THE INVENTION

1. Field of the Invention

This invention relates to a press molding method for an optical element designed to form a highly accurate optical element such as an aspherical lens by press molding.

2. Related Background Art

Recently there has been proposed a manufacturing method for molding a glass lens used in an optical apparatus or the like at one shot without the intermediary polishing step. In this method, as disclosed, for example, in Japanese Patent Application Laid-Open No. 1-87524, high accuracy is achieved by adopting a molding method whereby a glass blank in its fully softened state is first press-molded by a first pressing pressure, whereafter temperature is dropped, and then a glass lens is press-molded by a second pressing pressure.

On the other hand, as described in Japanese Patent Application Laid-Open No. 2-38329, it is also conceived to bring the molding surfaces of upper and lower mold members into contact with a glass gnarl, heating said glass gnarl from around said the mold members by means such as induction heating, and thereafter press-molding it to thereby obtain a uniform temperature distribution of the glass gnarl and avoid the creation of a bad product by a non-uniform temperature distribution, thus accomplishing molding of good yield.

However, in both of the above-described examples of the prior art, a predetermined pressure is applied in the process of deforming the glass blank in press molding. Accordingly, for example, where a molding mold and a glass blank are heated discretely from each other and the glass blank is put into the molding mold immediately before press molding, or where the glass blank put into the molding mold is kept hot or heated by only the heat conduction from the molding mold, if the glass blank is press-molded immediately after being put into the mold, there is a danger of the glass blank being subjected to pressing pressure before the temperature of the central portion of the glass blank is increased to the temperature of the molding mold, and being cracked by thermal stress strain or the molding mold being deformed.

Also, where the glass blank is press-molded at a predetermined time after it is put into the molding mold, not only molding that extends, but particularly a thick glass blank has a considerable difference between the temperature of the surface thereof and the temperature of the central portion thereof, and the difference in the temperature distribution thereof gives rise to the problem as noted above.

SUMMARY OF THE INVENTION

The present invention has been made in view of the above-noted circumstances, and intends to provide a press molding method for an optical element in which molding is effected while pressing pressure is continuously or stepwise controlled so that at the initial stage in which the temperature distribution of a glass material is not sufficiently uniform throughout molding may be effected with relatively low pressing pressure and in a state in which the whole of the glass material has been uniformly increased in temperature, press molding may be effected with the pressing pressure increased.

According to the present invention, in a press molding apparatus for an optical element designed to press a glass material in its softened state by the use of a molding mold member, and form on said glass material an optical functional surface corresponding to the molding surface of said mold member, said glass material is press-molded while pressing pressure is continuously or stepwise varied so that during press molding, at a temperature whereat the glass viscosity of said glass material corresponds to $10^{12}$–$10^{11}$ poise, molding may be started with pressing pressure of 10 kg/cm$^2$–100 kg/cm$^2$, whereafter in a temperature range in which the glass viscosity $\times$ of the central portion of the glass blank corresponds to $10^{11}$–$10^{10}$ poise, pressing pressure in the range of $10\times(10^{11-x})$–$100+10\times(10^{11-x})$ kg/cm$^2$ may be applied and further, at a temperature whereat said glass viscosity corresponds to $10^{10}$ or less, pressing pressure of 100 kg/cm$^2$ or more may be applied.

DESCRIPTION OF THE PREFERRED EMBODIMENT

The invention will hereinafter be described specifically with respect to an embodiment thereof shown in the drawings. In the figures of the drawings, the reference numeral 1 designates a molded glass material (glass blank) located between upper and lower mold members 2 and 3. The mold members 2 and 3 are provided with molding surfaces 2a and 3a on the opposed upper and lower surfaces thereof, and are of such fit structure that the optical axis of an article to be molded fits in a barrel mold 4, and are made vertically slidable along the outer peripheries thereof. The optical element molded in this mold is, for example, a biconvex lens (glass kind SF8) having a diameter of 26 mm.

Figure 1:
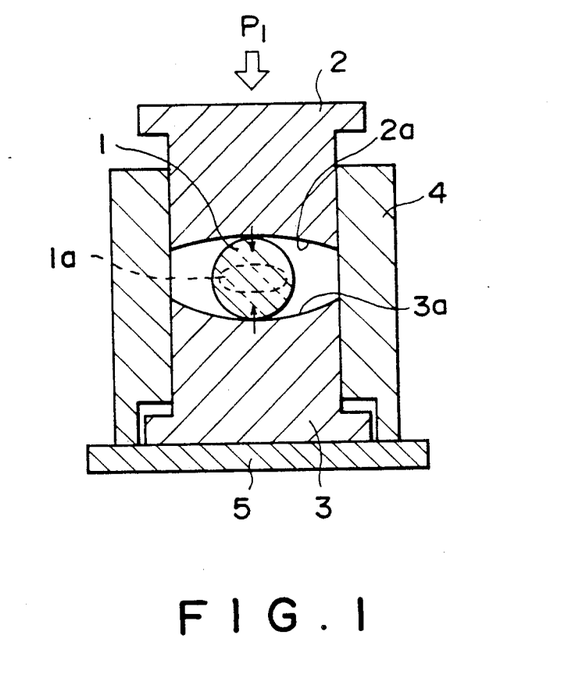
FIG. 1 is an illustration for illustrating the operation of an embodiment of the present invention.
Figure 2:
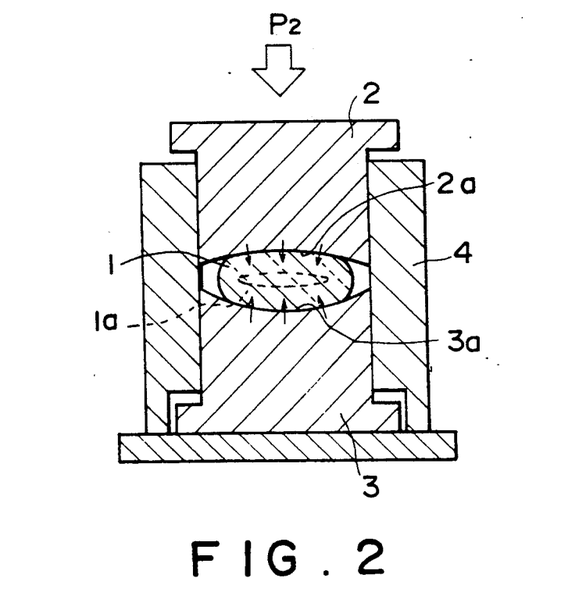
FIG. 2 is an illustration for illustrating the operation of the embodiment of the present invention.
Figure 4:
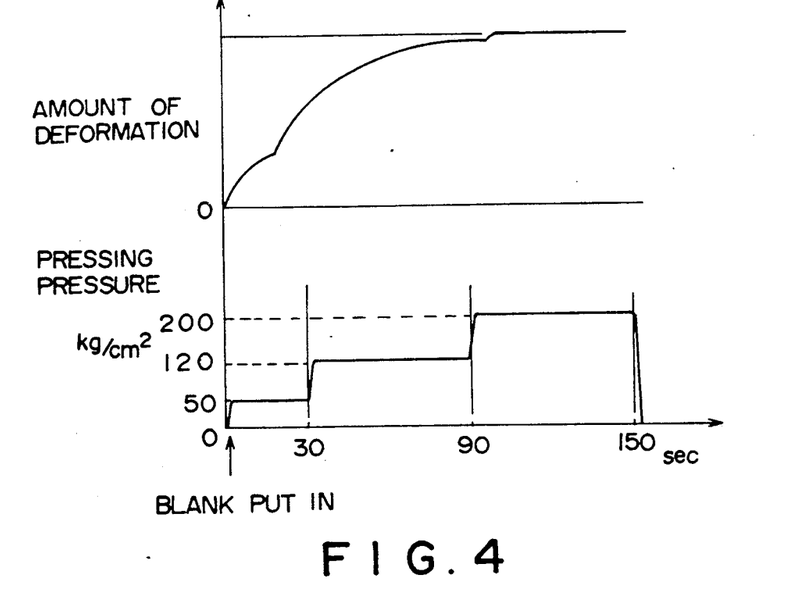
FIG. 4 is a graph showing the relation among the pressing pressure, the amount of deformation and time according to the present invention.
Figure 5:
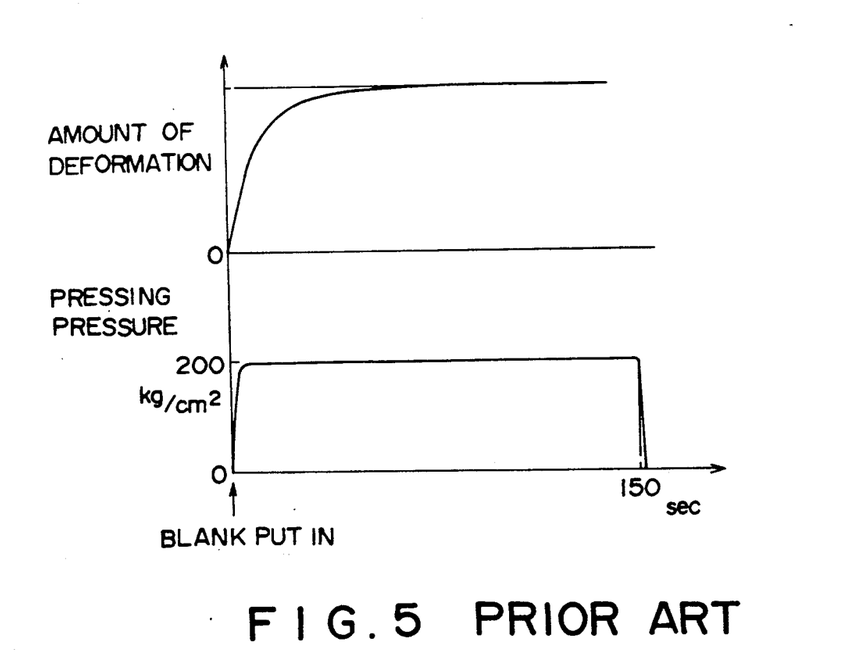
FIG. 5 is a graph showing the relations among the pressing pressure, the amount of deformation and time according to the prior art.

Such a press molding apparatus is used in the following manner. The upper mold member 2 is first lifted by the use of lifting means (not shown), and then for example, a spherical glass material (glass blank) 1 is placed on the lower mold member 3, and as shown in FIG. 1, the upper mold member 2 is lowered. In this case, the mold members 2 and 3 are heated to e.g. 510° C. by the use of suitable heating means (not shown). The glass blank 1 is also heated to e.g. 450° C., whereafter it is placed there. Immediately thereafter, the mold member 2 is lowered by the use of a mold operating member (not shown) such as a ram, and the glass blank is press-molded between the mold members 2 and 3. At this stage, the glass blank receives heat from the portions thereof which are in contact with the mold members 2 and 3, but the interior thereof, still has a low temperature portion as indicated by 1a (the temperature of the glass blank at this time, if shown in terms of the viscosity of the glass, is approximately $10^{11}$ poise). In this case, the initial pressing pressure is 50 kg/cm$^2$. When in this state, as shown in FIG. 4, the glass blank is held for 30 seconds, the glass blank increases in temperature in the meantime and the viscosity of the glass becomes $10^{10}$ poise. The pressing pressure is then increased to 120 kg/cm$^2$ until the glass blank 1 reaches a required press temperature, and the glass blank is held in this state for about 60 seconds. In the meantime, as shown in FIG. 2, the glass blank is contacted by the molding surfaces 2a and 3a over a wider area. The low temperature portion 1a then decreases (the temperature of the central portion of the glass becomes about $10^9$ poise in terms of glass viscosity).

Figure 3:
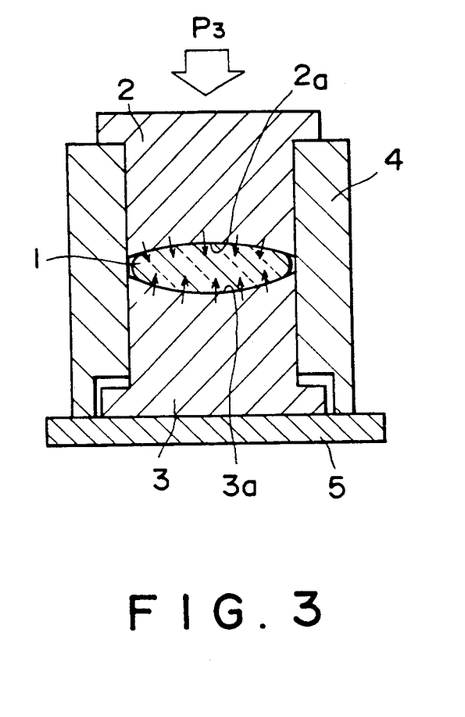
FIG. 3 is an illustration for illustrating the operation of the embodiment of the present invention.

When the pressing pressure is further increased to 200 kg/cm$^2$, the glass blank comes to have a desired thickness as shown in FIG. 3, and the mold members 2 and 3 transfer their molding surfaces 2a and 3a to the upper and lower portions of the glass blank 1. Such a state is held for about 60 seconds, as shown in FIG. 4. Thereafter, the pressing pressure is released and the cooling step is entered. If required, the pressing position is also maintained during the cooling step and the molding mold is kept closed until 350° C. is reached. Thereafter, the upper mold member 2 is lifted, the molding mold is opened and the molded article is taken out.

When actually, molding was effected continuously over about 100 shots by the above-described molding method and then the molding mold was examined, no remarkable deformation was found in the molding mold and sufficiently usable accuracy was maintained. Incidentally, when molding was effected continuously over 20-30 shots by the prior-art method in which pressing was started immediately after the charging of a blank, two to three Newton stripes were formed on the surface of the molded article and deformation of the molding mold was found. Also, when a glass blank was put into the molding mold and the glass blank was held in contact with the molding mold (pressure≈0) for 30 seconds and thereafter, and it was molded with predetermined pressing pressure, deformation of the molding mold occurred at the order of 50 shots and further, slight cloudiness was found on the molding surface of the molding mold and therefore, the experiment using this system was discontinued in view also of the fact that the molding tact extends in this system.

In this embodiment of the step as shown in FIG. 4, the pressing pressure is changed at three stages, whereas the number of stages is not particularly limited, but is set in the mode of embodiment. Also, if possible, the change in the pressure may be continuously controlled.

Also, press molding, which considers the disappearance appearance of uneven portions, is effected so that the temperature distribution of the glass blank may become uniform, but with attention paid to the pressing pressure in the actually pressed area (the area of contact between the molding mold and the glass) which varies even if temperature is uniform, the pressing pressure (total pressure) is varied from a low state to a high state so that said pressing pressure in the actually pressed area may become constant, whereby there can also be provided a molding method in which the deformation of the molding mold is little.

Also, in the present embodiment, the glass blank is put into the molding mold immediately before pressing, but if no particular problem is posed, the glass blank may be placed beforehand into the molding mold and heated with the molding mold, whereafter it may be pressed, and this can also be carried out in the above-described modification.

Further, in the above-described embodiment, it is also possible to start pressing, as in the prior art, before the temperature rise process of the molding mold and the blank comes to an end.

Figure 6:
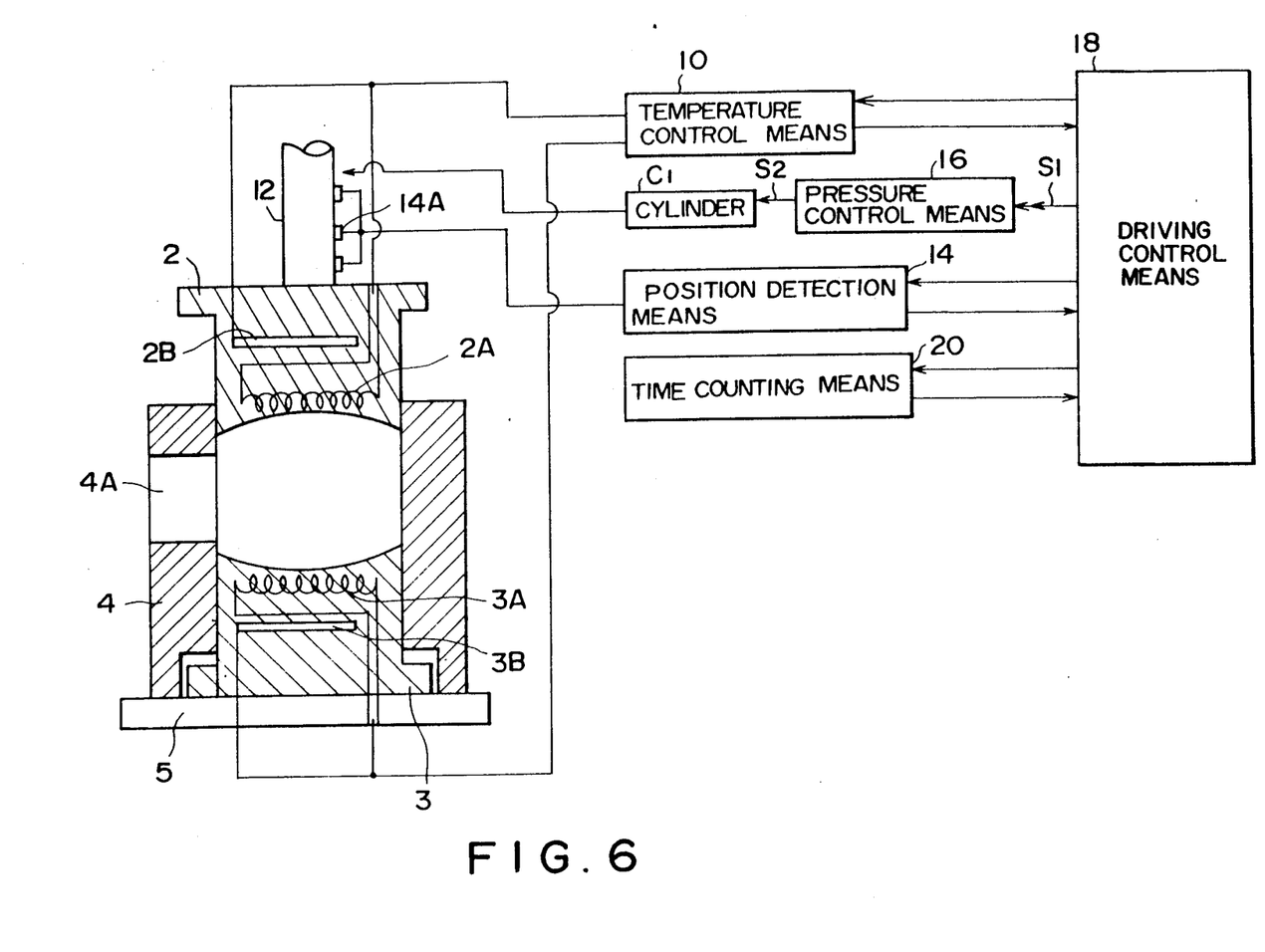
FIG. 6 is an illustration of an apparatus according to a specific embodiment of the present invention.
Figure 7A:
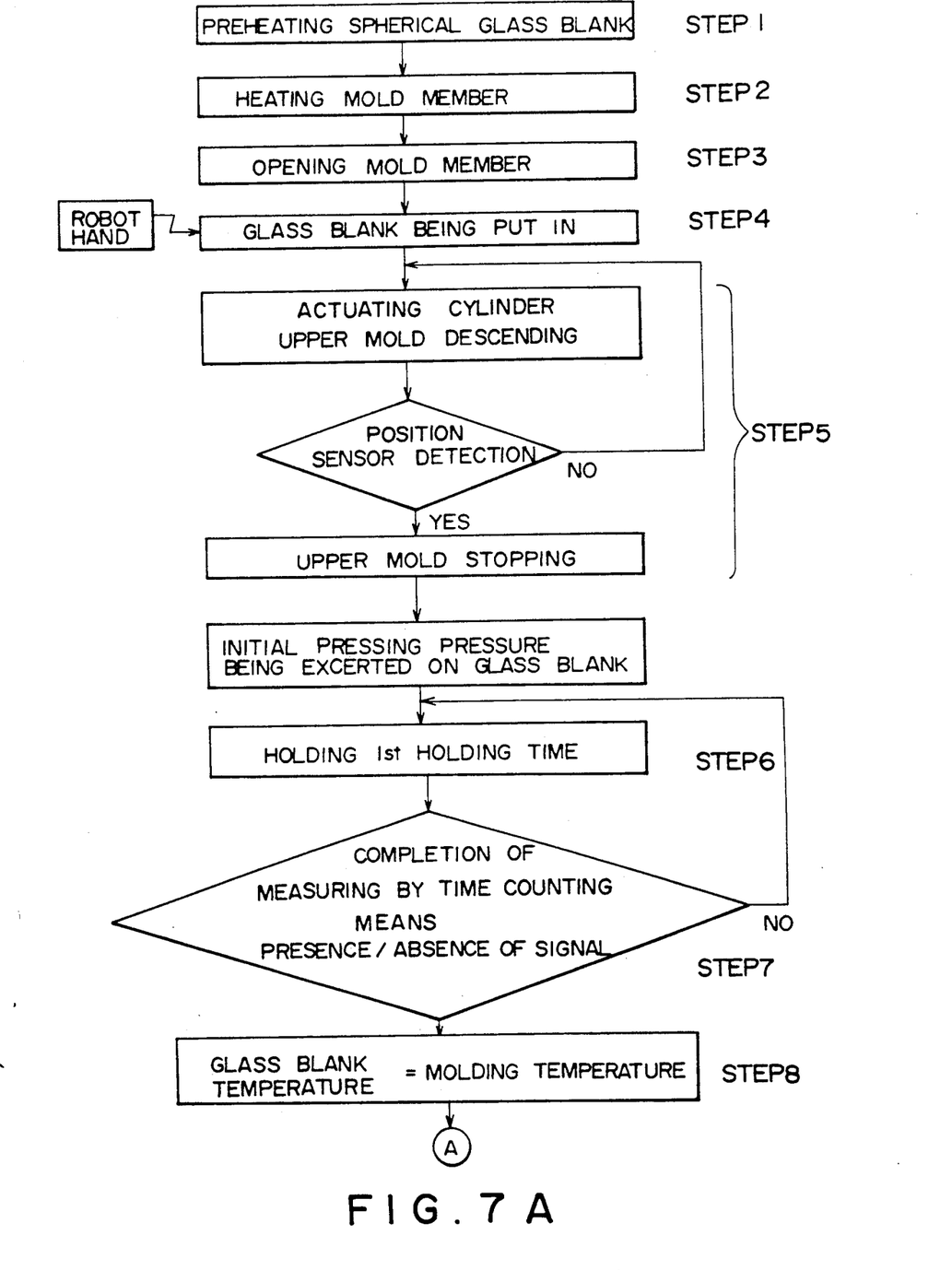
FIGS. 7A, 7B and 7C are flow charts showing the operation sequence of the apparatus of FIG. 6.
Figure 7B:
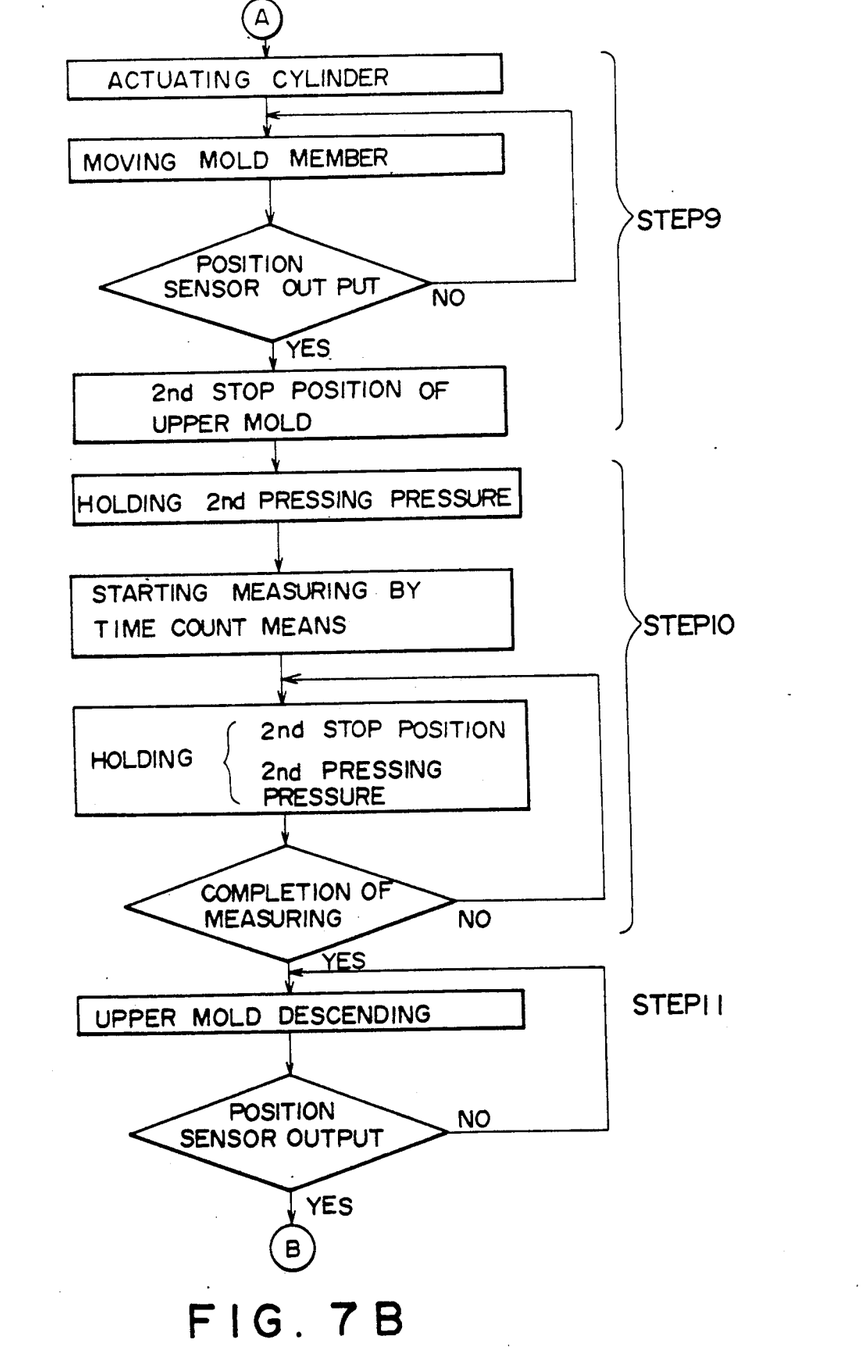
Figure 7C:
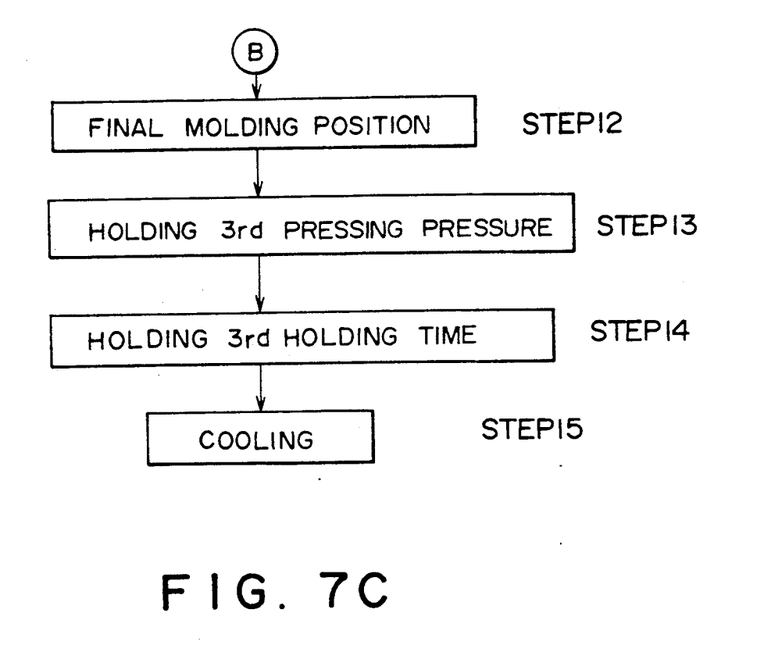

FIG. 6 is an illustration of an apparatus for embodying the aforedescribed processes of FIGS. 1 to 3, and FIGS. 7A, 7B and 7C are flow charts showing the operation of the apparatus. The operation will hereinafter be described in succession.

In the apparatus, the heaters 2A, 3A and the temperature measuring sensors 2B, 3B of heating means for heating the pair of upper and lower mold members 2 and 3 and the glass blank 1 are embedded in the pair of mold members, and the heaters 2A, 3A and sensors 2B, 3B are connected to temperature control means 10.

The upper mold member 2 is connected to pressing means 12 and the piston (not shown) of the cylinder $C_1$ of the pressing means 12. The reference numeral 14 designates a position sensor for detecting the position of the piston. The cylinder $C_1$ and the position sensor 14 are connected to pressure control means 16 for imparting pressure to the mold members.

In the molding process, a substantially spherical glass blank 1 is first prepared by a manufacturing method and step, not shown, and the glass blank 1 is preheated by heating means, not shown. The temperature to which the glass blank is preheated is desirably within the temperature range of $10^{12-11}$ poise in terms of glass viscosity (step 1). The mold members 2 and 3 are heated by said heating means to a temperature range at which the vicinities of the molding surfaces of the mold members mold the glass blank into the final shape of a molded article (in the present embodiment, a temperature range corresponding to the glass viscosity of $10^{10-11}$ poise) (step 2). Subsequently, when the preparations of the steps 1 and are completed, a signal $S_1$ for setting the mold members 2 and 3 at their initial positions is output from driving control means 18 to the pressure control means 16, and the mold members 2 and 3 are held in their open positions (step 3).

In response to the outputting of the signal $S_1$, the preheated spherical glass blank 1 is put into the mold by a robot hand, not shown (step 4). Thereafter, in response to a signal indicative of the termination of the putting-in by the robot hand, a first actuation signal $S_2$ is input from the driving control means 18 to the cylinder $C_1$. In this state, the glass blank 1 put into the mold absorbs the heat of the mold members and is stabilized from the preheating temperature to a temperature corresponding to the glass viscosity of $10^{12-11}$ poise which is a first temperature condition. In this temperature state, as described in connection with FIG. 1, the central portion of the glass blank has a low temperature portion. By the first actuation signal $S_2$, the upper mold 2 descends by a predetermined amount from its open position through the piston.

When with the actuation of the piston, the upper mold descends by the predetermined amount and comes to a first stop position, the position sensor 14 outputs a detection signal, and the actuation of the cylinder $C_1$ is stopped by this detection signal to thereby stop the descent of the upper mold member (step 5).

In the state at the step 5 in which upper mold member is held in the first stop position, a load of initial pressing pressure 50 kg/cm$^2$ is applied to the upper mold member to thereby press the spherical glass blank 1 from the spherical shape of FIG. 1 to the flattened shape of FIG. 2.

This initial pressing pressure is kept to thereby hold the state of the first stop position for 30 seconds (a first holding time) (step 6). This first holding time starts with the output of the detection signal of the position sensor 14 as the starting signal of a time counting means 20.

When the time counting means 20 counts up the first holding time, it outputs a first counting completion signal (step 7).

During the counting operation by the time counting means 20, the glass blank is flattened as shown in FIG. 2 and the area of contact thereof with the upper and lower mold members increases and thus, heat conduction takes place from the mold members to the glass blank, and the glass blank reaches a temperature corresponding to the temperature condition $10^{11-10}$ poise of the mold members (step 8).

When the first counting completion signal is output from the time counting means, a second cylinder actuation signal is sent from the control means to cylinder driving means to thereby cause the upper mold member to descend further, and the cavity surface formed by the clearance between the upper mold member and the lower mold member is held in the molded position of the final molded article (a second stop position).

When the upper mold member arrives at the second stop position with the further descent thereof from the first stop position, a signal indicative of the arrival of the upper mold member at the second stop position is output from the position sensor 14 and the driving of the cylinder C$_1$ is restrained, whereby the upper mold member is held in the second stop position (step 9).

When the upper mold member arrives at the second stop position, the pressing pressure is increased to a second pressure of 120 kg/cm$^2$. In this state, time counting is again effected by the time counting means and a second holding time of 60 seconds is set (step 10). When a second counting completion signal indicative of the lapse of time is output from the time counting means, the cylinder driving means is actuated on the basis of this completion signal and the upper mold member is caused to descend toward the final stop position (step 11). The detection of the final stop position of the upper mold member is done by the output signal of the position sensor 14, and the actuation of the cylinder is stopped by the signal from this position sensor, whereby the mold members are held in the final molding position (step 12).

In the final molding position of the mold members, a third pressing pressure of 200 kg/cm$^2$ is applied to the glass blank, and the glass blank is kept within a temperature range of $10^{11-10}$ poise, which is the glass molding temperature, and is molded from the flattened state in the second stop position into the shape of the final molded article (step 13).

In the state of the step 13, the time counting means is operated by the output of the detection signal from the position sensor, which is indicative of the final stop position, and a third holding time of 60 seconds is held (step 14).

After the lapse of 60 seconds, which is the third holding time, the glass blank is deformed into the shape of the final molded article, and the surface shapes and surface roughness of the molding surfaces of the upper and lower mold members are accurately transferred to the surface of the glass.

Cooling means is operated by the output signal from the time counting means produced by the lapse of the third holding time, thereby cooling the molded article.

According to the present invention, as described above in detail, molding is effected while the pressing pressure is continuously or stepwise controlled so that at the initial stage in which the temperature distribution of the glass blank is not sufficiently uniform throughout, molding may be effected with relatively low pressing pressure. In a state in which the whole of the glass blank has uniformly risen in temperature, the pressing pressure may be increased and press molding may be effected, and therefore, no overstrain is exerted on the molding mold and the glass blank and thus, the molding mold is not deformed and the life of the mold is prolonged and moreover, any crack of the glass during pressing is eliminated and the yield is bettered, and molding can be accomplished without the tact being extended. Further, if required, it will also become possible to make of the molding mold out of a material of relatively low strength. Also, it is unnecessary that the glass blank be limited to a shape approximate to the molded article and for example, ball-like glass blanks can also be adopted.

What is claimed is:

1. A process of heating and pressing a glass material to thereby mold an optical element, comprising:

preparing an upper mold member and a lower mold member provided with heating means, while said upper mold and said lower mold are being heated to a final molding temperature;

preparing a preheated glass material and putting it between said upper mold member and said lower mold member;

a first pressing step of closing said mold members and pressing said glass material with an initial pressing pressure in a state in which a temperature of a central portion said glass material is lower than a molding temperature at which said glass material is molded into a final shape;

a second pressing step of applying a pressing greater than the initial pressing pressure at said first pressing step and holding said mold members in a final closed position when after said first pressing step, the temperature of the entirety of said glass material reaches the final molding temperature range; and the step of holding said mold members in the final closed position and cooling a molded article between said mold members to a predetermined temperature.

2. A process according to claim 1, further comprising the steps of:

keeping the pressing pressure at said first pressing step constant for a predetermined time; and keeping the pressing pressure at said second pressing step constant for a predetermined time.

3. A process according to claim 1, wherein the temperature of said glass material at the start of said first pressing step is within a temperature range corresponding to $10^{12-11}$ poise, and the temperature of said glass material at the start of said second pressing step is within a temperature range corresponding to $10^{11-10}$ poise.

4. A method of using a substantially spherical glass blank as a glass material and pressing said glass blank by a pair of mold members to thereby mold a lens, comprising the steps of:
   preheating said glass blank;
   heating said mold members to a final molding temperature range;
   putting said preheated glass blank between said mold members; and
   imparting pressure said mold members and transferring shapes of molding surfaces of said mold members to a initial spherical shape of said glass blank having a low temperature portion to thereby press-mold said glass blank into a shape of a final molded article that does not have the low temperature portion, said press-molding step continuously or stepwise increasing the pressing pressure with a temperature rise of said glass blank and a decrease in the low temperature portion of said glass blank, after said glass blank has been put between said mold members.

5. A method according to claim 4, further comprising the step of:
   holding the pressing pressures in a first temperature state and a second temperature state of said glass blank during said press-molding step for predetermined times, respectively.

* * * * *

UNITED STATES PATENT AND TRADEMARK OFFICE
CERTIFICATE OF CORRECTION

PATENT NO. : 5,188,650

DATED : February 23, 1993

INVENTOR(S) : TAKESHI NOMURA

It is certified that error appears in the above-identified patent and that said Letters Patent is hereby corrected as shown below:

ON THE TITLE PAGE:

Column [30]

Line FAPD, "Nov. 25, 1991 [JP] Japan ............ 3-335475" should read --Nov. 25, 1991 [JP] Japan ....... 3-334575--.

IN THE ABSTRACT

Column [57]

Line 13, "$10^{21}$-$10^{11}$ poise," should read --$10^{12}$-$10^{11}$ poise,--.

Column 1

Line 26, "said" should read --the--.
Line 27, "said" should be deleted.
Line 66, "throughout" should read --throughout,--.

Column 2

Line 68, "thereof" should read --thereof,--.

Column 3

Line 2, "thereof," should read --thereof--.
Line 31, "actually," should be deleted.
Line 58, "appearance" should be deleted.

Column 4

Line 19, "members and" should read --members 2 and--.

UNITED STATES PATENT AND TRADEMARK OFFICE
CERTIFICATE OF CORRECTION

PATENT NO. : 5,188,650
DATED : February 23, 1993
INVENTOR(S) : TAKESHI NOMURA

Page 2 of 2

It is certified that error appears in the above-identified patent and that said Letters Patent is hereby corrected as shown below:

Column 5

Line 3, "the" (second occurrence) should be deleted and "upper" should read --the upper--.
Line 64, "the" (second occurrence) should be deleted.

Column 6

Line 26, "of the" should read --the--.
Line 29, "and" should read --and,--.
Line 47, "pressing" (second occurrence) should read --pressing pressure--.

Column 7

Line 12, "pressure" (second occurrence) should read --pressure by--.
Line 14, "a" should read --an--.

Signed and Sealed this

Twenty-ninth Day of March, 1994

Attest:

BRUCE LEHMAN

Attesting Officer

Commissioner of Patents and Trademarks